United States Patent
Weibler

(10) Patent No.: US 11,980,861 B2
(45) Date of Patent: May 14, 2024

(54) METHOD OF MIXING AQUEOUS SOLUTIONS

(71) Applicant: ProMinent GmbH, Heidelberg (DE)

(72) Inventor: Wolfgang Weibler, Heddesheim (DE)

(73) Assignee: ProMinent GmbH, Heidelberg (DE)

(*) Notice: Subject to any disclaimer, the term of this patent is extended or adjusted under 35 U.S.C. 154(b) by 368 days.

(21) Appl. No.: 17/152,966

(22) Filed: Jan. 20, 2021

(65) Prior Publication Data

US 2021/0229052 A1 Jul. 29, 2021

(30) Foreign Application Priority Data

Jan. 23, 2020 (DE) .................... 10 2020 101 610.7

(51) Int. Cl.
*B01F 35/00* (2022.01)
*B01F 33/84* (2022.01)
*B01F 35/88* (2022.01)

(52) U.S. Cl.
CPC .......... *B01F 35/8821* (2022.01); *B01F 33/84* (2022.01); *B01F 35/8823* (2022.01)

(58) Field of Classification Search
CPC ... B01F 35/8823; B01F 35/8821; B01F 33/84
See application file for complete search history.

(56) References Cited

U.S. PATENT DOCUMENTS

| | | | |
|---|---|---|---|
| 3,010,404 | A | 11/1961 | Anderson |
| 4,524,801 | A | 6/1985 | Magnasco et al. |
| 8,688,268 | B2 | 4/2014 | Samain et al. |
| 2005/0008554 | A1 | 1/2005 | Nowosielski-Slepowron et al. |
| 2016/0252081 | A1* | 9/2016 | Jones ............... F04B 19/22 |
| | | | 417/406 |

FOREIGN PATENT DOCUMENTS

| | | |
|---|---|---|
| CN | 102196745 A | 9/2011 |
| CN | 205550098 U | 9/2016 |
| DE | 3244907 A1 | 1/1983 |
| DE | 202005013090 U1 | 1/2007 |
| DE | 102006060578 A1 | 6/2008 |

OTHER PUBLICATIONS

DE 102006060578 English machine translation (Year: 2008).*
Extended European Search Report, European Patent Office, Gundlach, Harald, EP Application No. 20209120.3, dated Apr. 8, 2021.
Office Action, dated Dec. 21, 2023, Chinese Application No. 202110088747.7 (and English Translation).

* cited by examiner

*Primary Examiner* — Anshu Bhatia
(74) *Attorney, Agent, or Firm* — PAUL & PAUL

(57) ABSTRACT

The present invention concerns a method of mixing aqueous solutions, an apparatus for carrying out said method and the use of dosing devices with integrated dosing monitoring and stroke length control in an installation for mixing container aqueous solutions.

23 Claims, 2 Drawing Sheets

METHOD OF MIXING AQUEOUS SOLUTIONS

The present invention concerns a method of mixing aqueous solutions, an apparatus for carrying out that method and the use of dosing devices with integrated dosing monitoring and stroke length closed-loop control is an installation for mixing aqueous solutions.

For exactly dosing relatively small amounts of aqueous solutions it is known to use dosing devices. Such dosing devices are used for example for feeding aqueous solutions of chemical substances to a mixing container. The dosing device has a dosing chamber in which a displacement element is reciprocable between two positions, wherein the volume of the dosing chamber in the one position is larger than in the other position.

Such a dosing device can be for example a diaphragm dosing pump. Here a moveable diaphragm acts as the displacement element. In operation the dosing chamber is connected to a suction line by way of a suction check valve and to a pressure line by way of a pressure check valve. Both the suction check valve and also the pressure check valve can be part of the dosing device. They can however also be provided at the installation.

When the diaphragm is moved into the position in which the volume of the dosing chamber is at its largest then a delivery medium is sucked into the dosing chamber from the suction line by way of the suction valve. Subsequently the diaphragm is moved in the direction of that position in which the volume of the dosing chamber is at its smallest. The suction check valve is closed thereby, whereupon the pressure in the dosing chamber rises until the pressure check valve opens and the delivery medium in the dosing chamber is urged into the pressure line.

The dosing device further has an actuator for driving the displacement element, the actuator having an actuator input for an electrical actuation signal and being so constructed that an electrical actuation signal applied to the actuator input is converted into a mechanical movement.

In the case of a dosing diaphragm pump the diaphragm can for example be driven hydraulically so that the actuator includes a corresponding piston, one surface of which is in contact with the hydraulic fluid.

Alternatively the diaphragm can also be driven magnetically. By way of example the diaphragm can be fixedly connected to a thrust rod which is mounted axially moveably on the longitudinal axis in a magnetic casing fixedly anchored in the pump housing so that the thrust rod and therewith the diaphragm, upon electrical actuation of a magnetic coil, are drawn into the magnet casing against the action of a compression spring, into the bore in the magnet casing, and after deactivation of the magnet the thrust rod moves back into the starting position under the force of the compression spring so that, upon continued activation and deactivation of the magnetic coil, the diaphragm performs an oscillating movement. In this case the magnetic coil is to be viewed as the actuator.

In methods of producing an aqueous solution of a reaction product comprising at least two substances such dosing devices are connected in parallel so that the substances are fed to a mixing container almost at the same time. Mixing of the substances is effected by the dosing strokes of the dosing device. Such a method is implemented for example in a chlorine dioxide installation in which sodium chlorite ($NaClO_2$) is reacted with hydrochloric acid (HCl) in accordance with the following reaction equation:

$$5NaClO_2 + 4HCl \rightarrow 4ClO_2 + 5NaCl + 2H_2O$$

The resulting aqueous solution of the reaction product chlorine dioxide can be used in communal drinking water and sewerage treatment and in industrial applications for water disinfection and/or the oxidation of water contents.

In those applications however fluctuations can occur in regard to quantity and quality of the water to be disinfected. This means that the added amount of chlorine dioxide has to be continuously matched to the currently prevailing requirement as otherwise the water to be disinfected can have an excessive surplus or a deficiency of chlorine dioxide.

With an excessively high addition of chlorine dioxide the water is no longer suitable for human use. If in contrast an excessively small amount of chlorine dioxide is added then the disinfecting effect and/or the oxidation effect is limited and it is no longer possible to guarantee an adequate water quality.

In the installations known hitherto from the state of the art for mixing aqueous solutions checking of the dosing of the aqueous solutions is generally effected by a dosing monitoring system disposed outside the pump, with float members for detecting the dosing stroke.

Such dosing monitoring systems register whether a preset threshold value of an amount to be dosingly added is exceeded.

The movement of the displacement element is effected substantially sinusoidally. During a pressure stroke $H_D$ the displacement element moves from the deflection $S_A$ to the deflection $S_E$. During the subsequent suction stroke $h_S$ the displacement element is moved from the deflection $S_E$ back to the deflection $S_A$. The stroke period H is composed of the pressure stroke $h_D$ and the suction stroke $h_S$.

The displacement element however is generally moved between the position of maximum deflection $S_{max}$ and $S_{min}$ in order to make the level of efficiency of the dosing device as high as possible. Moreover stroke length adjustment of the dosing devices in the state of the art is effected manually and is therefore markedly more complicated and expensive than the change in the frequency which can be subjected to closed-loop control by way of the motor control means.

The change in frequency however can result in an irregular distribution in respect of time of the dosing operations for the various aqueous solutions and thus can lead to worse mixing. In addition dosing devices with the same stroke lengths generally do not have the same stroke volume due to manufacturing factors. The resulting problem of different dosing amounts can be resolved with the installations in the state of the art only by the dosing devices being operated at different frequencies or by the stroke length being manually re-adjusted.

With that background in mind the object of the invention is to provide a method of mixing aqueous solutions, which permits better mixing of the various aqueous solutions in the mixing container and better adaptation of the dosing amounts.

That object is attained by the method as set forth in claim 1. This includes steps A) to D) which are described in greater detail hereinafter. In a preferred embodiment of the invention they are carried out in the alphabetical sequence.

Step A)

In step A) at least two aqueous solutions are provided. According to the invention the term aqueous solution is used to denote the homogenous mixture of a substance in the solvent water, wherein the solvent water can have up to 25% wt of further polar solvents like for example alcohols or ethers. The at least two aqueous solutions are provided in separate storage containers. Insofar as the aqueous solutions have substances which can react with each other, that affords the advantage that, by virtue of the separation, it is possible to avoid reaction of the substances before being introduced into the mixing container. If more than two aqueous solutions are provided it is certainly possible to provided a plurality of aqueous solutions in the same storage container if they do not have any substances which react with each other under the conditions in the storage container.

Step B)

Step B) involves introducing the aqueous solutions into a mixing container so that a mixture of the aqueous solutions results. According to the invention the term mixing container is used to denote any open and closed receptacle into which the aqueous solutions can be introduced. In a preferred embodiment this involves a closed receptacle. Introduction of the aqueous solutions is effected by at least one respective dosing device connected to one of the storage containers. The dosing devices can also be connected to more than one storage container and thus introduce more than one aqueous solution into the mixing container, wherein preferably the substances contained in the aqueous solutions do not react with each other under the introduction conditions. The dosing device has the following components:

1) the dosing chamber having a displacement element arranged moveably in such a way that it is reciprocable between two points of maximum deflection $S_{max}$ and $S_{min}$, preferably steplessly, wherein the volume of the dosing chamber is at a maximum in the position $S_{max}$ and at a minimum in the position $S_{min}$ and wherein the spacing of $S_{max}$ and $S_{min}$ corresponds to the maximum stroke length $H_{max}$, and
2) an actuator for driving the displacement element, which has an actuator input for an electrical actuation signal and is so constructed that an electrical actuation signal at the actuator input is converted into a mechanical movement.

The operation of introducing the solutions by the dosing devices is effected by the displacement element performing an oscillating movement between two positions $S_A$ and $S_E$ within the range of $S_{max}$ and $S_{min}$, so that the aqueous solutions are sucked out of the storage container into the dosing chamber by a suction stroke $h_S$ and are then pushed by a pressure stroke $h_D$ into the mixing container, wherein the spacing $H_{A-E}$ of the two positions $S_A$ and $S_E$ is less than or equal to the maximum stroke length $H_{max}$.

To permit optimum mixing of the aqueous solutions in the mixing container in a preferred embodiment of the invention it has a flow breaker, that is to say a component which is arranged within the mixing container and which increases the turbulence in the flowing liquids. In a particularly preferred embodiment the flow breaker is an apertured plate.

Step C)

In step C) the operation of determining the introduced amount of the aqueous solutions can be effected by dosing monitoring. In an embodiment of the invention the dosing monitoring means is arranged outside the dosing device. This has the advantage that it can be easily changed or repaired in the case of a malfunction.

In a preferred embodiment of the invention the dosing monitoring means is arranged within the dosing device. This has the advantage that there is no need to integrate a separate component in the installation. Dosing monitoring can be effected for example by a motor operating parameter like the motor voltage U or a motor current I being measured, by a closed-loop variable being calculated therefrom and possibly from further known motor characteristics, and by the at least one control variable being compared to a predetermined reference variable. Such a method is described for example in WO 2011/117199 A1.

In a particularly preferred embodiment of the invention the at least one dosing device is driven with a drive motor having a shaft driven by the motor and the introduced amount of the aqueous solutions is calculated by a dosing monitoring means arranged within the dosing device, as described hereinbefore, wherein the control variable is the torque $M_{actual}$ and possibly the magnetic flux $\Phi_{actual}$ of the motor.

The dosing monitoring means is preferably of such a configuration that the amount of the aqueous solutions, that is introduced into the mixing container by the dosing device, can be ascertained from the measurement value obtained by the dosing monitoring means. That can be effected for example by a flow meter. Preferably dosing monitoring is effected by way of measurement of a motor operating parameter as set forth hereinbefore.

The operation of determining the spacing $H_{A-E}$ of the two positions $S_A$ and $S_E$, that is to say the stroke length, is effected by stroke length control. That can be effected for example by detecting the position of the displacement element by means of a Hall sensor. The operation of determining the spacing $H_{A-E}$ can also be effected from a motor operating parameter and optionally further known motor characteristics.

The measurement variables ascertained by the dosing monitoring procedures are converted into a signal which is preferably electrical and that measurement signal is passed to the stroke length closed-loop control.

Alternatively or in addition to determining the introduced amounts of the aqueous solutions by means of dosing monitoring a physical and/or chemical measurement value of the mixture of the aqueous solutions is determined by means of a sensor, in the mixing container or preferably after discharge from the mixing container. If in an optional step E) described hereinafter a reaction product is formed, that measurement value is preferably dependent on the concentration of the reaction product in the mixture of the aqueous solutions. In a particularly preferred embodiment the sensor is arranged in a receptacle, for example an open or closed vessel or a pipe, in particular a water pipe, which contains the water to be treated with the mixture of the solutions and into which the mixture or aqueous solutions is discharged. If the sensor is arranged in that receptacle then dosing can be effected in dependence on a target value to be attained, of a physical and/or chemical measurement value. Such a structure is shown for example in FIG. 2.

The measurement value is converted into a signal which is preferably electrical and passed to the stroke length control so that this value is taken into account when adapting the stroke length.

In a preferred embodiment of the invention the stroke length control adapts the spacing $H_{A-E}$ in such a way that the actual value of the physical and/or chemical measurement value is approximated to a predetermined target value.

The aqueous solution can be further diluted after discharge and prior to determining the physical and/or chemical measurement value. That has to be suitably taken into account when determining the measurement value.

The sensor can be for example an amperometric or an optical sensor, for example a UV-VIS sensor.

Step D)

The measurement values determined in step C) are communicated to the at least one stroke length closed-loop control and the stroke length control adapts the movement of the actuator and thus the spacing $H_{A-E}$ of at least one dosing device in dependence on the measurement values provided by the dosing monitoring means, namely the amount of the aqueous solutions. According to the invention the expression providing a measurement value is used to mean that a dosing monitoring means or a sensor converts the respective measurement value into a signal which is preferably electrical and communicated that signal to the stroke length control. The stroke length control utilizes the measurement value or values, calculates a target stroke length on the basis of predetermined or calculated target values and provides an electrical actuation signal for the actuator so that the stroke length is adapted to the target stroke length.

Step E)

In a preferred embodiment of the invention the method is used for producing a reaction product. For that purpose step E) involves reaction of at least two substances contained in the aqueous solutions in the mixing container so that this results in a reaction product which is preferably in the form of an aqueous solution.

For that case preferably the measurement value of the sensor, which is possibly determined in step C), is dependent on the concentration of the reaction product formed.

Step F)

In a preferred embodiment of the invention the mixture which resulted from the introduction of the at least two aqueous solutions is discharged from the mixing container again. That can be effected solely by the increased pressure created by the dosing devices when introducing the aqueous solutions. In a further embodiment the installation has an additional dosing device to permit or facilitate discharge. In a particularly preferred embodiment step E) precedes step F) so that the discharged mixture of the aqueous solutions has a reaction product.

In a preferred embodiment of the invention steps A)-F) are carried out in the alphabetical sequence.

In a preferred embodiment of the invention the stroke length control is disposed in one of the dosing devices, that is to say within the housing. That affords the advantage that the installation can be kept structurally simple and no further components are required.

Preferably the installation for carrying out the method has a respective dosing monitoring means for each dosing device, wherein it is particularly preferably arranged within the dosing device, that is to say within the housing thereof. This gives the advantage that the installation can be kept structurally simple and no further components are required.

Preferably the installation for carrying out the method respectively has a dosing monitoring means and a stroke length control for each dosing device, wherein it is particularly preferably arranged within the dosing device, that is to say within the housing thereof. This gives the advantage that the installation can be kept structurally simple and no further components are required.

In a preferred embodiment of the invention the dosing device is a diaphragm pump, preferably a magnetic diaphragm pump.

As the dosing amounts of the aqueous solutions can be controlled with the method according to the invention by way of the stroke length control the stroke frequency can be kept substantially identical. That permits distribution of the dosing strokes which is uniform in respect of time and thus even better mixing of the aqueous solutions.

In a preferred embodiment of the invention the duration of a stroke period comprising a suction stroke $h_S$ and a pressure stroke $h_D$ is substantially the same for successive stroke periods, wherein substantially the same means that the time difference between two successive stroke periods divided by the duration of the longest period is $\leq 0.2$, preferably $\leq 0.15$, still more preferably $\leq 0.10$ and most preferably $\leq 0.05$.

In a preferred embodiment of the invention the spacing $H_{A-E}$ is $\leq 0.5\ H_{max}$. Adjustment of a stroke length which is substantially less than the maximum stroke length is generally not desirable in dosing devices as a maximum level of efficiency of the dosing device is possible only when utilizing the maximum stroke $H_{max}$.

The inventors found however that when dosing a plurality of aqueous solutions in a mixing container, it is advantageous to keep the stroke length as short as possible and in return to keep the stroke frequency, that is to say the inverse of the stroke duration, as high as possible. In that way a larger number of dosing operations of smaller amounts of the aqueous solution is effected in the mixing container, thereby achieving better distribution of the aqueous solutions in the mixing container. If the aqueous solutions contain substances which react together in the mixing container a more uniform reaction can be achieved in that way.

In a preferred embodiment of the invention the method is used for producing a reaction product from substances contained in the aqueous solutions. In this case it is particularly preferred if the spacings $H_{A-E}$ are so adjusted by the stroke length control that the amounts of all substances introduced into the mixing container for producing the reaction product are substantially the same, wherein substantially the same means that the deviation in the amounts of substances divided by the largest amount of substance in the aqueous solution is $\leq 0.2$, preferably $\leq 0.15$, still more preferably $\leq 0.10$ and most preferably $\leq 0.05$.

Having regard to stoichiometric means according to the invention that the amounts of substances introduced with the aqueous solution are to be multiplied by the inverse of the stoichiometry coefficient of the reaction. That is illustrated hereinafter by means of an example. The production of $ClO_2$ is effected from $NaClO_2$ and $HCl$ in accordance with the following reaction equation:

$$5NaClO_2 + 4HCl \rightarrow 4ClO_2 + 5NaCl + 2H_2O$$

In comparison of the amounts of substances it is to be taken into account that 5 mol $NaClO_2$ react with only 4 mol HCl, and the amounts are then to be suitably multiplied with the inverse of the stoichiometry coefficient of the reaction:

$$n_{rel,NaClO2} = \frac{n(NaClO_2)}{5},\ n_{rel,HCl} = \frac{n(HCl)}{4}$$

wherein n is the amount of substances which can be determined from the volume of introduced aqueous solution and the concentration of the substance in that solution.

According to the invention the amounts are substantially the same if the difference of those "relative" amounts $n_{rel,NaClO2}$ and $n_{rel,HCl}$ divided by the largest relative amount of $n_{rel,NaClO2}$ and $n_{rel,HCl}$ is ≤0.2, preferably ≤0.15, still more preferably ≤0.10 and most preferably ≤0.05.

In a preferred embodiment of the invention the start and/or the end of the stroke period comprising the suction stroke $h_S$ and a pressure stroke $h_D$ is substantially the same for all dosing devices, wherein substantially the same means that the time deviation divided by the duration of the longest period is ≤0.2, preferably ≤0.15, still more preferably ≤0.10 and most preferably ≤0.05.

Synchronization has the advantage that the aqueous solutions are introduced almost completely at the same time so that optimum mixing and reaction can be ensured. Preferably the stroke periods are suitably synchronized and the spacings $H_{A-E}$ are so adjusted by the stroke length controls that the introduced amounts are substantially the same having regard to stoichiometry. In that way mixing of the aqueous solutions and possibly reaction of the substances contained therein is still better improved, while avoiding unreacted substances being present in the aqueous solution of the reaction product.

It will be noted however that applications are also conceivable in which the start and/or the end of the stroke period of the devices are to be displaced, for example to compensate for different travel lengths in relation to the mixing container.

In a preferred embodiment of the invention mixing of the aqueous solutions is implemented after discharge from the mixing container by an additional mixer. The term mixer is used to denote any component which further improves the mixing effect. That can include for example stirrers. In an embodiment of the invention the additional mixer can be arranged within the mixing container. In another preferred embodiment the additional mixer is arranged outside the mixing container. In such an arrangement the additional mixer can be easily replaced or repaired in the event of a malfunction. If the installation has a sensor for detecting a physical and/or chemical measurement value of the mixture of the aqueous solutions mixing is preferably effected before the mixture of the solutions passes the sensor. In that way the physical and/or chemical measurement value obtained there is even more informative.

Preferably the method according to the invention is used for the production of the reaction product chlorine dioxide, wherein the substances separately contained in the aqueous solutions are hydrochloric acid and sodium chlorite. The resulting solution of the reaction product chlorine dioxide can be used for disinfecting water. The method according to the invention has the advantage that hydrochloric acid and sodium chlorite are particularly efficiently mixed together so that only small amounts of hydrochloric acid and sodium chlorite are present in the aqueous solution of the reaction product. As aqueous solutions of chlorine dioxide are used for disinfecting water the amounts of hydrochloric acid and sodium chlorite are to be kept correspondingly small.

The present invention also concerns an installation for carrying out the method, which has:
a) at least two separate storage containers, from which the at least two aqueous solutions can be delivered by means of respectively at least one dosing device,
b) at least one mixing container having at least two inlets by way of which the at least two aqueous solutions can be introduced by means of the dosing devices and an outlet from which the mixture of the aqueous solutions can be discharged,
c) at least two dosing devices having the following components:
1) a dosing chamber having a displacement element arranged moveably in such a way that it is steplessly reciprocable between two points of maximum deflection $S_{max}$ and $S_{min}$, wherein the volume of the dosing chamber in the position $S_{max}$ is at a maximum and in the position $S_{min}$ is at a minimum and wherein the spacing of $S_{max}$ and $S_{min}$ corresponds to the maximum stroke length $H_{max}$, and
2) an actuator for driving the displacement element which has an actuator input for an electrical actuation signal and is so constructed that an electrical actuation signal at the actuator input is converted into a mechanical movement,
d) at least one dosing monitoring means with which the amount of the aqueous solution introduced into the mixing container can be determined and which is preferably arranged in one of the dosing devices,
e) at least one stroke length closed-loop control which can receive the electrical measurement signal provided by the dosing monitoring means and optionally the sensor and convert it into an electrical actuation signal for the actuator input of at least one dosing device, wherein the at least one stroke length control is preferably arranged in a dosing device, wherein the installation preferably has:
f) at least one sensor for detecting a physical and/or chemical measurement value of the aqueous solution. Detection of the measurement value can be effected in the mixing container, but preferably after discharge therefrom. In a preferred embodiment of the invention the method is used for the production of a reaction product from the substances contained in the aqueous solutions. In that case it is particularly preferred that the physical and/or chemical measurement value is dependent on the concentration of the reaction product.

The sensor has a sensor output for an electrical measurement signal and is of such a configuration that it detects the physical and/or chemical measurement value, converts it into an electrical measurement signal and makes same available at the sensor output, which can be passed to the stroke length control so that the stroke length monitoring means receives same.

In a preferred embodiment of the invention the installation additionally has a mixer, by means of which the mixture of the aqueous solutions, that is discharged from the mixing container, can be intensively mixed once again.

In a further preferred embodiment of the invention the installation additionally has a dosing device, by means of which the mixture of the aqueous solutions, that is discharged from the mixing container, can be mixed with water.

The invention also concerns the use of dosing devices having integrated dosing monitoring and stroke length control in an installation for mixing aqueous solutions. In the context according to the invention integrated means that the dosing monitoring and stroke length control are arranged within the dosing device, that is to say within the housing thereof. In a preferred embodiment each dosing device of the installation has an integrated dosing monitoring means and stroke length control.

DESCRIPTION OF THE FIGURES

List of References 1 storage container
2 dosing device
3 mixing container
4 additional mixer
5 sensor
6 main water line

BRIEF DESCRIPTION OF THE FIGURES

Figure 1:
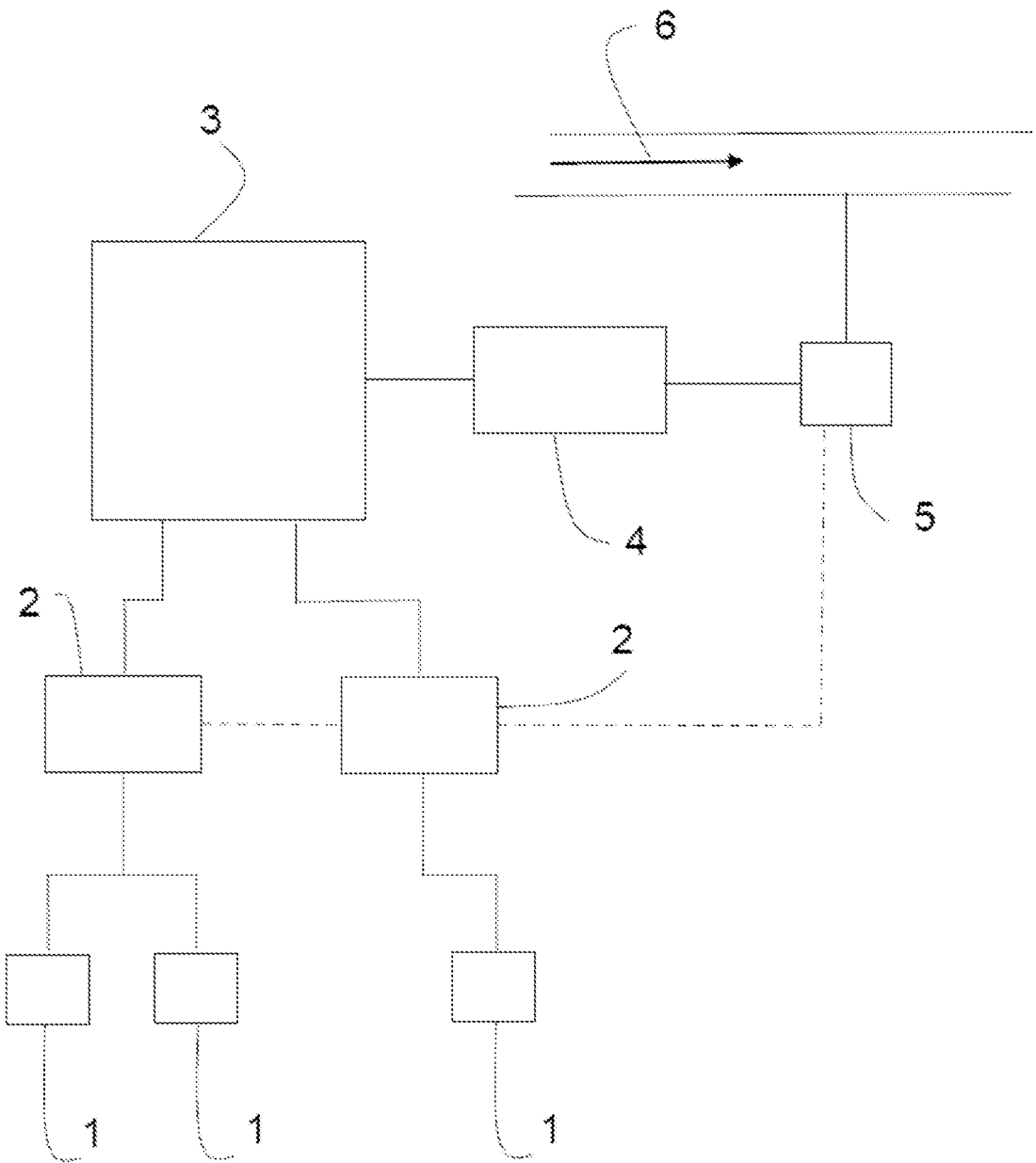

FIG. 1 shows an embodiment of the installation according to the invention, and

Figure 2:
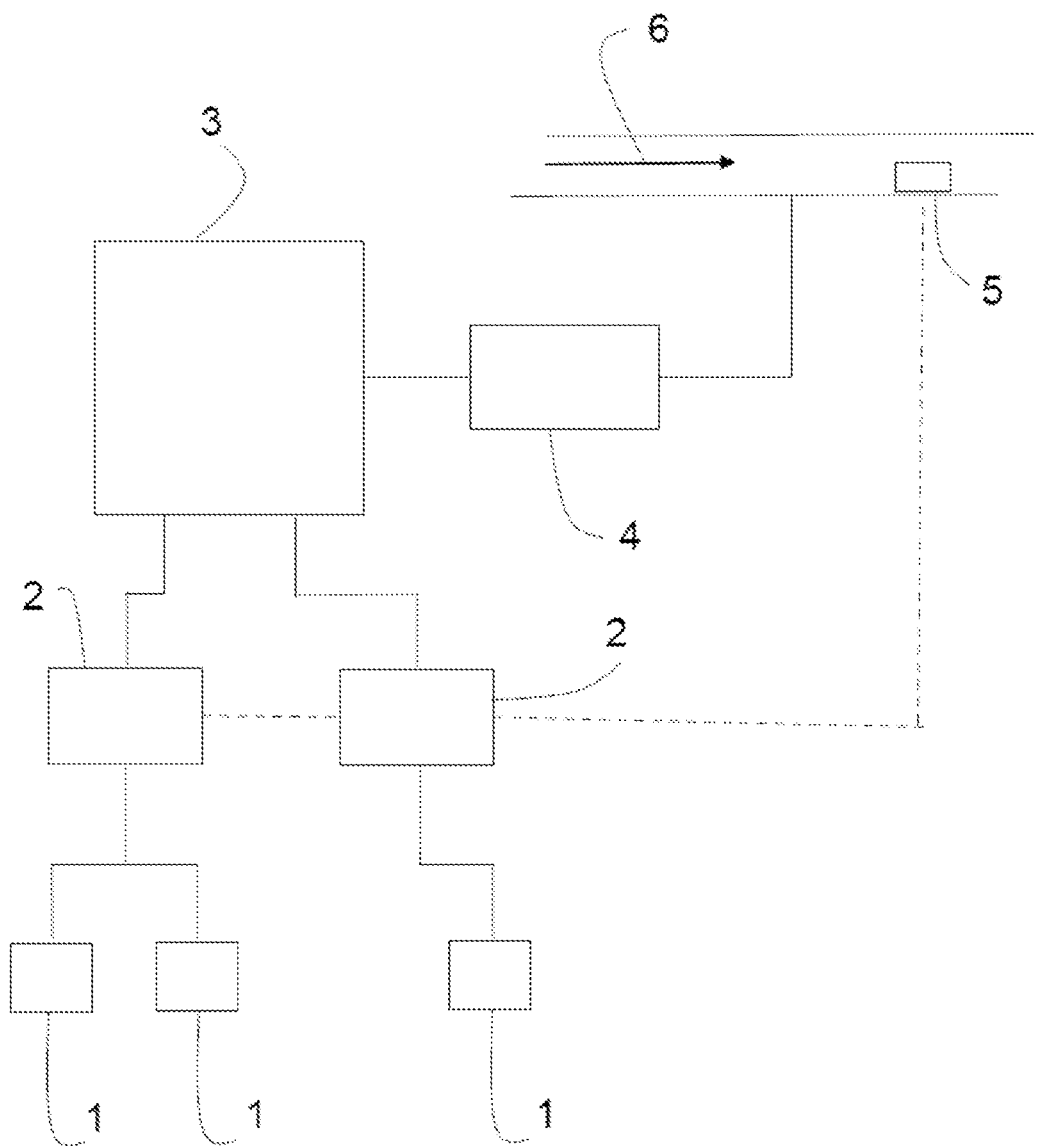

FIG. 2 shows a further embodiment of the installation according to the invention.

DETAILED DESCRIPTION OF THE FIGURES

The embodiment of the installation according to the invention shown in FIG. 1 has three storage containers 2 which contain a respective aqueous solution. The aqueous solutions are fed to the mixing container 3 by the dosing devices 2 having integrated dosing monitoring and stroke length control and are intensively mixed once again in an additional mixer 4 after being discharged from the mixing container 3. Before the mixture is fed to the main water line it passes through the sensor 5 which detects a physical and/or chemical measurement value and communicates same to the stroke length controls of the dosing devices by way of an electrical signal (shown in broken line). They consequently adapt the spacing $H_{A-E}$ in dependence on said measurement values.

The embodiment of the installation according to the invention shown in FIG. 2 has three storage containers 2 which contain a respective aqueous solution. The aqueous solutions are fed to the mixing container 3 by the dosing devices 2 having integrated dosing monitoring and stroke length control and are intensively mixed once again in an additional mixer 4 after being discharged from the mixing container 3. The sensor 5 which detects a physical and/or chemical measurement value and communicates same to the stroke length controls of the dosing devices by way of an electrical signal (shown in broken line) is arranged in the main water line in the flow direction downstream of the additively dosing location. The stroke length controls subsequently adapt the spacing $H_{A-E}$ in dependence on the physical and/or chemical measurement value. In that way the added amount can be controlled in dependence on said measurement value.

The invention claimed is:

1. A method of mixing aqueous solutions, which has the following steps:
    A) providing aqueous solutions in at least two separate storage containers,
    B) introducing the aqueous solutions into a mixing container by at least one respective dosing device so that a mixture of the aqueous solutions is produced, wherein the dosing device has the following components:
        1) a dosing chamber having a displacement element which is arranged moveably in such a way that it can be reciprocated between two points of maximum deflection $S_{max}$ and $S_{min}$, wherein the volume of the dosing chamber in the position $S_{max}$ is at a maximum and in the position $S_{min}$ is at a minimum and wherein the spacing of $S_{max}$ and $S_{min}$ corresponds to a maximum stroke length $H_{max}$,
        2) an actuator for driving the displacement element which has an actuator input for an electrical actuation signal and is so constructed that an electrical actuation signal at the actuator input is converted into a mechanical movement,
    wherein introduction is effected by the displacement element performing an oscillating movement between two positions $S_A$ and $S_E$ within the range of $S_{max}$ and $S_{min}$ so that the aqueous solution is sucked out of the storage container into the dosing chamber by a suction stroke $h_S$ and is then pushed into the mixing container by a pressure stroke $h_D$, wherein the spacing $H_{A-E}$ of the two positions $S_A$ and $S_E$ is less than or equal to the maximum stroke length $H_{max}$,
    C) determining the amounts of the aqueous solutions introduced into the mixing container by dosing monitoring means and/or detecting a physical and/or chemical measurement value of the mixture of the aqueous solutions by a sensor, characterised in that
    D) the measurement values determined in C) are communicated to at least one stroke length closed-loop control and the stroke length closed-loop control adapts the movement of the actuator and thus the spacing $H_{A-E}$ of at least one dosing device in dependence on said measurement values.

2. A method as set forth in claim 1 characterised in that the method has the following additional step:
    E) reacting substances contained in the aqueous solutions in the mixing container so that a reaction product is produced.

3. A method as set forth in claim 1 characterised in that the method has the following additional step:
    F) discharging the mixture of the aqueous solutions from the mixing container.

4. A method as set forth in claim 1 characterised in that each dosing device respectively has a dosing monitoring means and/or a stroke length control.

5. A method as set forth in claim 1 characterised in that the dosing device is a diaphragm pump.

6. A method as set forth in claim 1 characterised in that the duration of a stroke period comprising a suction stroke $h_S$ and a pressure stroke $h_D$ is substantially the same for successive stroke periods, wherein substantially the same means that the time deviation divided by the duration of the longest period is ≤0.2.

7. A method as set forth in claim 1, characterised in that the spacing $H_{A-E}$ is ≤0.5 $H_{max}$.

8. A method as set forth in claim 1 characterised in that the at least one dosing device comprises two or more dosing devices and that the spacings $H_{A-E}$ of the individual dosing devices are so adjusted that the amounts of all substances introduced into the mixing container for production of the reaction product are substantially the same having regard to stoichiometry, wherein substantially the same means that the deviation in the amounts of substances divided by the largest amount of substance is ≤0.2.

9. A method as set forth in claim 1 characterised in that the at least one dosing device comprises two or more dosing devices and that the start and the end of a stroke period comprising a suction stroke $h_S$ and a pressure stroke $h_D$ is substantially the same for at least two dosing devices, wherein substantially the same means that the time deviation divided by the duration of the longest period is ≤0.2.

10. A method as set forth in claim 1 characterised in that the mixture of the aqueous solutions is passed through an additional mixer after discharge from the mixing container.

11. A method as set forth in claim 1 characterised in that the substances contained in the aqueous solutions are hydrochloric acid and sodium chlorite.

12. An installation for carrying out a method as set forth in claim 1 which has the following components:
   a) at least two separate storage containers, from which the at least two aqueous solutions can be delivered by means of respectively at least one dosing device,
   b) at least one mixing container having at least two inlets by way of which the at least two aqueous solutions can be introduced by means of the dosing devices and an outlet from which the mixture of the aqueous solutions can be discharged,
   c) at least two dosing devices having the following components:
      1) a dosing chamber having a displacement element arranged moveably in such a way that it can be reciprocated between two points of maximum deflection $S_{max}$ and $S_{min}$, wherein the volume of the dosing chamber in the position $S_{max}$ is at a maximum and in the position $S_{min}$ is at a minimum and wherein the spacing of $S_{max}$ and $S_{min}$ corresponds to the maximum stroke length $H_{max}$, and
      2) an actuator for driving the displacement element which has an actuator input for an electrical actuation signal and is so constructed that an electrical actuation signal at the actuator input is converted into a mechanical movement,
   d) at least one dosing monitoring means with which the amount of the aqueous solution introduced into the mixing container can be determined,
   e) at least one stroke length closed-loop control which can receive the electrical measurement signal provided by the dosing monitoring means and convert it into an electrical actuation signal for the actuator input of at least one dosing device, wherein the installation preferably has:
   f) at least one sensor for detecting a physical and/or chemical measurement value of the mixture of the aqueous solutions, which has a sensor output for an electrical measurement signal and is of such a configuration that it detects the physical and/or chemical measurement value, converts it into an electrical measurement signal and makes same available at the sensor output, so that the stroke length monitoring can receive same.

13. An installation as set forth in claim 1 characterised in that it additionally has a mixer.

14. An installation as set forth in claim 1 characterised in that it additionally has a dosing device, by means of which the mixture of the aqueous solutions, that is discharged from the mixing container, can be mixed with water.

15. Use of dosing devices with integrated dosing monitoring and stroke length control in an installation for mixing aqueous solutions.

16. A method as set forth in claim 4 characterised in that the dosing monitoring means and/or a stroke length control is arranged in the dosing device.

17. A method as set forth in claim 5 characterised in that the dosing device is a magnetic diaphragm pump.

18. A method as set forth in claim 10 characterised in that, prior to the sensor detecting a physical and/or chemical measurement value of the mixture of the aqueous solutions, the mixture of the aqueous solutions is passed through the additional mixer after discharge from the mixing container.

19. An installation according to claim 12 wherein the displacement element can be steplessly reciprocated between the two points of maximum deflection $S_{max}$ and $S_{min}$.

20. An installation according to claim 12 wherein the at least one dosing monitoring means is arranged in one of the dosing devices.

21. An installation according to claim 12 wherein the at least one stroke length closed-loop control can receive the electrical measurement signal provided by the sensor and convert it into an electrical actuation signal for the actuator input of at least one dosing device.

22. An installation according to claim 12 wherein the at least one stroke length closed-loop control is arranged in a dosing device.

23. An installation according to claim 12 wherein the installation has:
   f) at least one sensor for detecting a physical and/or chemical measurement value of the mixture of the aqueous solutions, which has a sensor output for an electrical measurement signal and is of such a configuration that it detects the physical and/or chemical measurement value, converts it into an electrical measurement signal and makes same available at the sensor output, so that the stroke length monitoring can receive same.

* * * * *